United States Patent
Sato et al.

(10) Patent No.: US 10,237,519 B2
(45) Date of Patent: Mar. 19, 2019

(54) IMAGING APPARATUS, IMAGING SYSTEM, IMAGE GENERATION APPARATUS, AND COLOR FILTER

(71) Applicant: Panasonic Intellectual Property Management Co., Ltd., Osaka (JP)

(72) Inventors: Satoshi Sato, Kyoto (JP); Kunio Nobori, Osaka (JP); Takamasa Ando, Osaka (JP); Takeo Azuma, Kyoto (JP); Nobuhiko Wakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 138 days.

(21) Appl. No.: 15/226,759

(22) Filed: Aug. 2, 2016

(65) Prior Publication Data
US 2017/0070709 A1    Mar. 9, 2017

(30) Foreign Application Priority Data
Sep. 8, 2015   (JP) .................................. 2015-176361

(51) Int. Cl.
*H04N 9/04* (2006.01)
*H04N 5/232* (2006.01)

(52) U.S. Cl.
CPC ......... *H04N 9/045* (2013.01); *H04N 5/23203* (2013.01); *H04N 2209/046* (2013.01)

(58) Field of Classification Search
CPC ............... H04N 9/045; H04N 5/23203; H04N 2209/046
See application file for complete search history.

(56) References Cited

U.S. PATENT DOCUMENTS

| 5,629,734 A | 5/1997 | Hamilton, Jr. et al. |
| 2011/0135216 A1 | 6/2011 | Hatakeyama |
| 2011/0249159 A1* | 10/2011 | Fukunaga ............... G03B 17/00 348/279 |
| 2013/0077862 A1* | 3/2013 | Nomura ................. H04N 9/045 382/167 |

(Continued)

FOREIGN PATENT DOCUMENTS

| JP | 2001-267543 | 9/2001 |
| JP | 2012-244495 | 12/2012 |
| WO | 2011/063311 | 5/2011 |

OTHER PUBLICATIONS

Leonid I. Rudin et al., "Nonlinear total variation based noise removal algorithms" Physica D, vol. 60, pp. 259-268, 1992.

(Continued)

*Primary Examiner* — Christopher K Peterson
(74) *Attorney, Agent, or Firm* — Wenderoth, Lind & Ponack, L.L.P.

(57) ABSTRACT

An imaging apparatus includes an image-forming optical system that forms an image by using optical signals; an imaging device that includes a plurality of pixels, receives, with the plurality of pixels, the optical signals used to form the image, and converts the optical signals into electric signals; and a color filter that is located between the image-forming optical system and the imaging device and has a light transmittance which differs according to positions on the color filter corresponding to the plurality of pixels and according to a plurality of wavelength bands.

20 Claims, 17 Drawing Sheets

(56) References Cited

U.S. PATENT DOCUMENTS

2014/0240508 A1* 8/2014 Gomi .................... G01J 3/2823
348/162

OTHER PUBLICATIONS

Shunsuke Ono et al., "Decorrelated Vectorial Total Variation", IEEE Conference on Computer Vision and Pattern Recognition, 2014.
J. Ma, "Improved Iterative Curvelet Thresholding for Compressed Sensing and Measurement", IEEE Transactions on Instrumentation and Measurement, vol. 60, No. 1, pp. 126-136, 2011.
Michal Aharon et al., "K-SVD: An Algorithm for Designing Overcomplete Dictionaries for Sparse Representation", IEEE Transactions on Signal Processing, vol. 54, No. 11, pp. 4311-4322, 2006.
Daisuke Kiku et al., "Minimized-Laplacian residual interpolation for color image demosaicking", IS & T/SPIE Electronic Imaging, 2014.
Manya V. Afonso et al., "Fast Image Recovery Using Variable Splitting and Constrained Optimization" IEEE Transactions on Image Processing, vol. 19, No. 9, pp. 2345-2356, 2010.

* cited by examiner

FIG. 10

(a) MODULATED IMAGE

| $y_1$ | $y_2$ | $y_3$ | $y_4$ |
| --- | --- | --- | --- |
| $y_5$ | $y_6$ | $y_7$ | $y_8$ |
| $y_9$ | $y_{10}$ | $y_{11}$ | $y_{12}$ |
| $y_{13}$ | $y_{14}$ | $y_{15}$ | $y_{16}$ |

(b) GENERATED R IMAGE

| $r_1$ | $r_2$ | $r_3$ | $r_4$ |
| --- | --- | --- | --- |
| $r_5$ | $r_6$ | $r_7$ | $r_8$ |
| $r_9$ | $r_{10}$ | $r_{11}$ | $r_{12}$ |
| $r_{13}$ | $r_{14}$ | $r_{15}$ | $r_{16}$ |

(c) GENERATED G IMAGE

| $g_1$ | $g_2$ | $g_3$ | $g_4$ |
| --- | --- | --- | --- |
| $g_5$ | $g_6$ | $g_7$ | $g_8$ |
| $g_9$ | $g_{10}$ | $g_{11}$ | $g_{12}$ |
| $g_{13}$ | $g_{14}$ | $g_{15}$ | $g_{16}$ |

(d) GENERATED B IMAGE

| $b_1$ | $b_2$ | $b_3$ | $b_4$ |
| --- | --- | --- | --- |
| $b_5$ | $b_6$ | $b_7$ | $b_8$ |
| $b_9$ | $b_{10}$ | $b_{11}$ | $b_{12}$ |
| $b_{13}$ | $b_{14}$ | $b_{15}$ | $b_{16}$ |

FIG. 15

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

IMAGING APPARATUS, IMAGING SYSTEM, IMAGE GENERATION APPARATUS, AND COLOR FILTER

BACKGROUND

1. Technical Field

The present disclosure relates to a color imaging apparatus using a compressed sensing technique.

2. Description of the Related Art

To capture a color image, it is necessary to obtain three different pieces of wavelength information for red (R), green (G), and blue (B) corresponding to the three primary colors of light. Many color imaging apparatuses are equipped with only one image sensor for reducing the size and cost and thus it is necessary to obtain three pieces of wavelength information for R, G, and B by using the one image sensor.

There is a method for obtaining three pieces of wavelength information for R, G, and B from pixels at different positions and performing a process called demosaicing so as to obtain three pieces of wavelength information for R, G, and B of all pixels.

FIG. 15 is a schematic diagram illustrating a widely used Bayer color filter array (CFA) (see, for example, U.S. Pat. No. 5,629,734). In the Bayer CFA, G pixels having similar visual characteristics to those of a human make up one-half of all the pixels whereas R pixels and B pixels each make up one-fourth thereof, and three pieces of wavelength information for R, G, and B of all the pixels are obtained through a demosaicing process.

On the other hand, Japanese Unexamined Patent Application Publication (Translation of PCT Application) No. 2013-511924 discloses a technique of performing demosaicing by arranging optical filter elements in a random color pattern and applying the compressed sending technique to a sample data set.

SUMMARY

However, in the methods according to the related art, only wavelength information for any of R, G, and B can be obtained from each pixel of an image sensor. Thus, the resolution of a color image generated through demosaicing may degrade and an artifact called false color may occur.

One non-limiting and exemplary embodiment provides an imaging apparatus capable of suppressing the degradation of resolution and the occurrence of artifacts by obtaining a color image by using one image sensor.

In one general aspect, the techniques disclosed here feature an imaging apparatus including an image-forming optical system that forms an image by using optical signals; an imaging device that includes a plurality of pixels, receives, with the plurality of pixels, the optical signals used to form the image, and converts the optical signals into electric signals; and a color filter that is located between the image-forming optical system and the imaging device and has a light transmittance which differs according to positions on the color filter corresponding to the plurality of pixels and according to a plurality of wavelength bands.

It should be noted that general or specific embodiments may be implemented as a system, a method, an integrated circuit, a computer program, a storage medium, or any selective combination thereof.

According to an embodiment of the present disclosure, R, G, and B images are obtained by performing in-pixel addition and are reconstructed by using the compressed sensing technique. Accordingly, a color image with a resolution equivalent to that of a three-chip image sensor can be obtained by using only one image sensor.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a schematic diagram illustrating a modulated image and generated images in which the number of pixels is 16;

FIG. 15 is a schematic diagram illustrating a Bayer color filter array;

DETAILED DESCRIPTION

Figure 1:
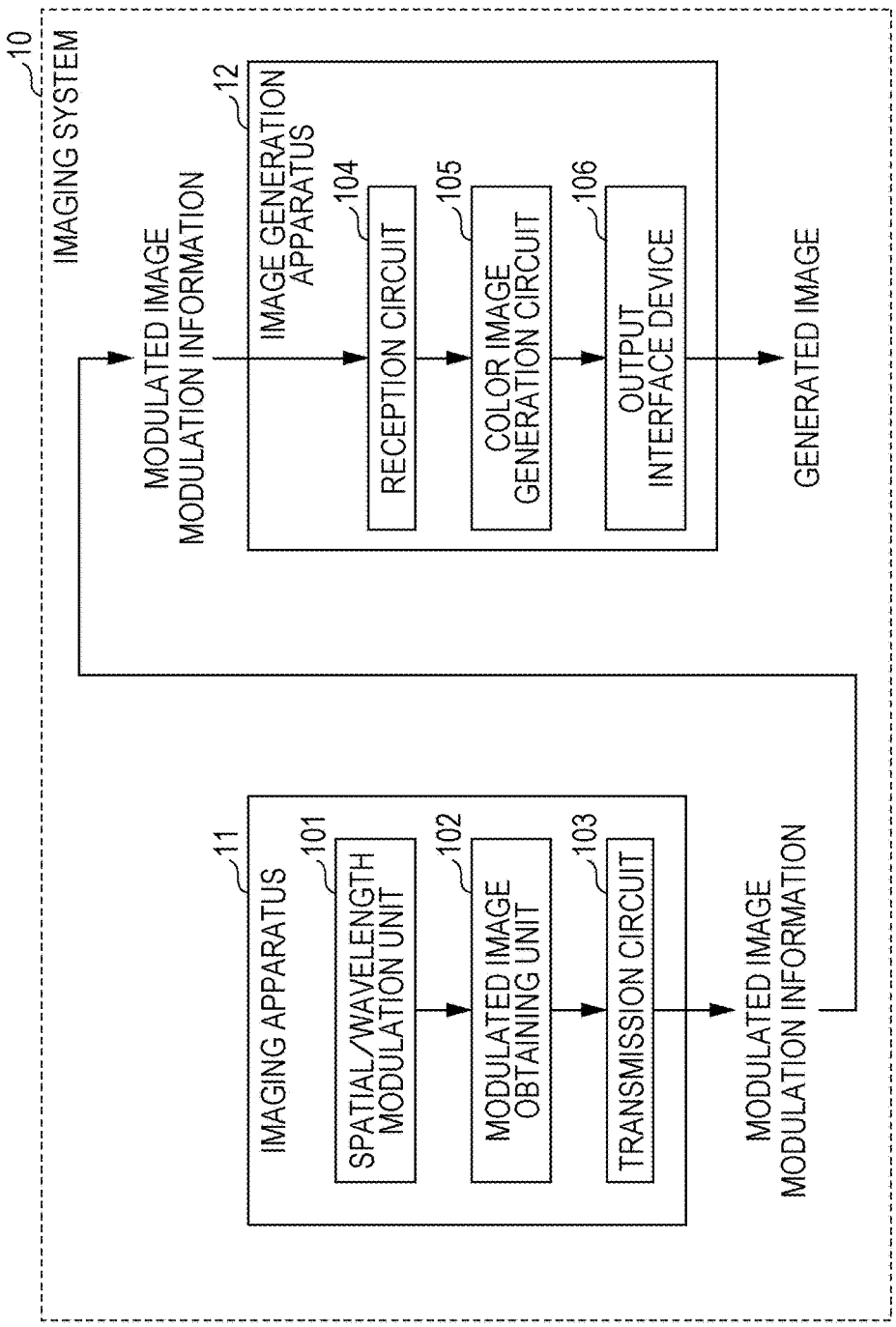
FIG. 1 is a schematic diagram illustrating the configuration of an imaging system according to an embodiment of the present disclosure.

An imaging apparatus according to an aspect of the present disclosure includes an image-forming optical system that forms an image by using optical signals; an imaging device that includes a plurality of pixels, receives, with the plurality of pixels, the optical signals used to form the image, and converts the optical signals into electric signals; and a color filter that is located between the image-forming optical system and the imaging device and has a light transmittance which differs according to positions on the color filter corresponding to the plurality of pixels and according to a plurality of wavelength bands.

The plurality of wavelength bands may be three wavelength bands.

The color filter may have a light transmittance which differs according to the positions on the color filter corresponding to the plurality of pixels and according to the plurality of wavelength bands.

Light transmittances at the individual positions on the color filter may have a correlation coefficient of less than 1 in each of the plurality of wavelength bands.

Light transmittances at n positions on the color filter and light transmittances at other n positions on the color filter may have no correlation in each of the plurality of wavelength bands.

Light transmittances at the individual positions on the color filter corresponding to the plurality of pixels may be distributed in accordance with uniform random numbers.

Light transmittances at the individual positions on the color filter corresponding to the plurality of pixels may be distributed in accordance with Gaussian random numbers.

The color filter may include a spatial light modulator having a light transmittance which differs according to the positions corresponding to the plurality of pixels and according to the plurality of wavelength bands.

The color filter may include cut-films each corresponding to one of the plurality of wavelength bands, and the cut-films each may have a thickness which differs according to the positions corresponding to the plurality of pixels.

The color filter may include cut-films each corresponding to one of the plurality of wavelength bands, and the cut-films each may be located only at positions corresponding to some pixels among the plurality of pixels.

The cut-films each may have a light transmittance of 1 in at least one of the plurality of wavelength bands.

The imaging apparatus may further include a transmission circuit that transmits information representing the light transmittance of the color filter.

An imaging system according to another aspect of the present disclosure includes an imaging apparatus and an image generation apparatus. The imaging apparatus includes an image-forming optical system that forms an image by using optical signals; an imaging device that includes a plurality of pixels, receives, with the plurality of pixels, the optical signals used to form the image, and converts the optical signals into electric signals; a color filter that is located between the image-forming optical system and the imaging device and has a light transmittance which differs according to positions on the color filter corresponding to the plurality of pixels and according to a plurality of wavelength bands; and a transmission circuit that transmits information representing the light transmittance of the color filter and the electric signals. The image generation apparatus includes a reception circuit that receives the information representing the light transmittance of the color filter and the electric signals; and an image generation circuit that generates an image for each of the plurality of wavelength bands by using the information representing the light transmittance and the electric signals.

An image generation apparatus according to another aspect of the present disclosure is used in an imaging system including an imaging apparatus. The imaging apparatus includes an image-forming optical system that forms an image by using optical signals; an imaging device that includes a plurality of pixels, receives, with the plurality of pixels, the optical signals used to form the image, and converts the optical signals into electric signals; a color filter that is located between the image-forming optical system and the imaging device and has a light transmittance which differs according to positions on the color filter corresponding to the plurality of pixels and according to a plurality of wavelength bands; and a transmission circuit that transmits information representing the light transmittance of the color filter and the electric signals. The image generation apparatus includes a reception circuit that receives the information representing the light transmittance of the color filter and the electric signals; and an image generation circuit that generates an image for each of the plurality of wavelength bands by using the information representing the light transmittance and the electric signals.

The image generation circuit may generate the image by using the information representing the light transmittance and the electric signals and by using a compressed sensing technique.

$y=Ax$ may be satisfied in which y represents a modulated image corresponding to the electric signals, x represents the image for each of the plurality of wavelength bands, and A represents a sampling matrix obtained in advance. The image generation circuit may generate, as the image, x that minimizes an evaluation function including a term including a square sum error $|Ax-y|^2$ of the modulated image y and a reconstructed signal Ax, a constraint term of pixel values of the image x for calculating a minimum value, and a total variation term in which a gradient of a luminance component and a gradient of a chrominance component of the image.

A color filter according to another aspect of the present disclosure filters light in a plurality of wavelength bands. A combination of light transmittances in the plurality of wavelength bands differs at certain positions at which light in the plurality of wavelength bands is transmitted.

The plurality of wavelength bands may include a first wavelength band, a second wavelength band, and a third wavelength band. At a first position, the color filter may have a light transmittance of 98 to 100% in the first wavelength band and may have a light transmittance of less than 98% in the second and third wavelength bands. At a second position different from the first position, the color filter may have a light transmittance of 98 to 100% in the second wavelength band and may have a light transmittance of less than 98% in the first and third wavelength bands. At a third position different from the first and second positions, the color filter may have a light transmittance of 98 to 100% in the third wavelength band and may have a light transmittance of less than 98% in the first and second wavelength bands.

In each of the first, second, and third wavelength bands, light transmittances at the individual positions may be distributed in accordance with uniform random numbers or Gaussian random numbers.

The image generation circuit may change a process if a modulated image corresponding to the electric signals is saturated.

The image generation circuit may generate an image x that minimizes an evaluation function. The evaluation function may include a constraint of giving 0 if a value calculated by multiplying the image x by a sampling matrix exceeds a saturation value and otherwise giving ∞ in a pixel where the modulated image is saturated.

An imaging apparatus according to another aspect of the present disclosure includes a color filter that receives light and outputs resulting light, the color filter including a plurality of parts including a first part and a second part; and an imaging device that includes a plurality of pixels that receive the resulting light and output a plurality of electric signals, the plurality of pixels and the plurality of parts corresponding to each other in a one-to-one relationship, the first part includes a third part and a fourth part, and the second part includes a fifth part and a sixth part, wherein a length between the third part and a surface where the color filter receives the light is smaller than a length between the fourth part and the surface, a length between the fifth part and the surface is either smaller or larger than a length between the sixth part and the surface, the third part has a light transmittance in a first wavelength that is higher than first light transmittances in wavelengths other than the first wavelength, the fifth part has a light transmittance in the first wavelength that is higher than the first light transmittances, the fourth part has a light transmittance in a second wavelength that is higher than second light transmittances in wavelengths other than the second wavelength, the sixth part has a light transmittance in the second wavelength that is higher than the second light transmittances, and the first wavelength is different from the second wavelength, and a thickness of the third part is different from a thickness of the fifth part, and a thickness of the fourth part is different from a thickness of the sixth part. A first light part of the light takes a path included in the fourth part after the first light part takes a path included in the third part, a second light part of the light may take a path included in the sixth part after the second light part takes a path included in the fifth part if the length between the fifth part and the surface is smaller than the length between the sixth part and the surface, the second light part may take a path included in the fifth part after the second light part takes a path included in the sixth part if the length between the fifth part and the surface is larger than the length between the sixth part and the surface, and wavelengths of visible light may include the first wavelength, the wavelengths other than the first wavelength, the second wavelength, and the wavelengths other than the second wavelength. The third part and the fifth part may be made by using a first type film, and the fourth part and the sixth part may be made by using a second type film different from the first type film, and each of the plurality of parts may cover the corresponding pixel and not cover pixels other than the corresponding pixel.

Hereinafter, a description will be given of an imaging system according to an embodiment of the present disclosure including an imaging apparatus and an image generation apparatus, with reference to the attached drawings.

FIG. 1 is a schematic diagram illustrating the configuration of an imaging system 10 according to an embodiment of the present disclosure. The imaging system 10 according to the embodiment includes an imaging apparatus 11 and an image generation apparatus 12.

The imaging apparatus 11 includes a spatial/wavelength modulation unit 101, a modulated image obtaining unit 102, and a transmission circuit 103. The image generation apparatus 12 includes a reception circuit 104, a color image generation circuit 105, and an output interface device 106.

First, the imaging apparatus 11 will be described with reference to FIG. 2.

Figure 2:
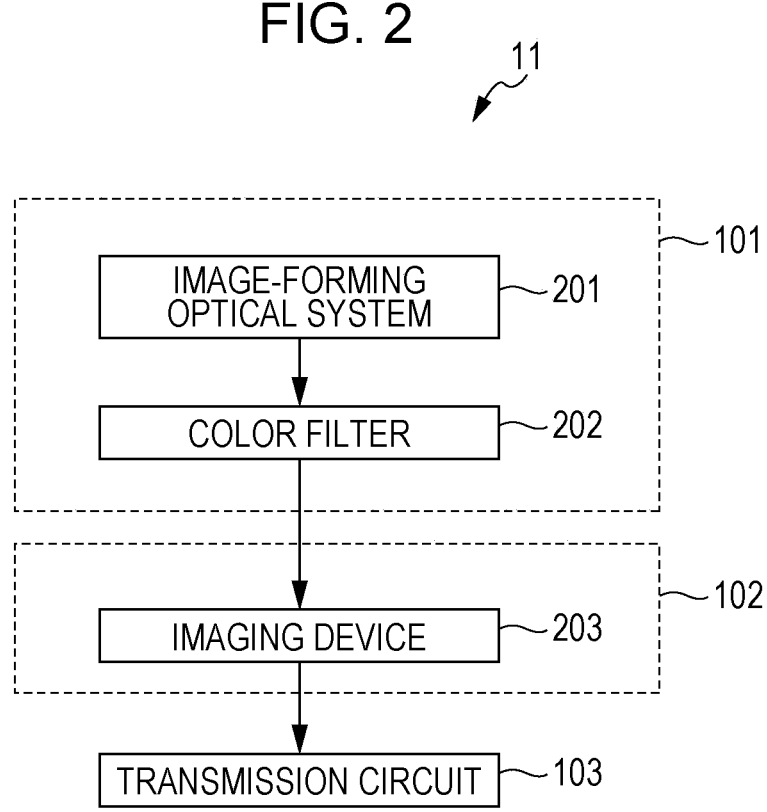
FIG. 2 is a diagram illustrating the detailed configurations of a spatial/wavelength modulation unit and a modulated image obtaining unit.

FIG. 2 illustrates the detailed configurations of the spatial/wavelength modulation unit 101 and the modulated image obtaining unit 102.

As illustrated in FIG. 2, the spatial/wavelength modulation unit 101 corresponds to an image-forming optical system 201 and a color filter 202. The modulated image obtaining unit 102 corresponds to an imaging device 203.

Image-Forming Optical System 201

The image-forming optical system 201 includes at least one or a plurality of lenses and a lens position adjuster (not illustrated). The one or the plurality of lenses collect light from a subject and forms an image by using optical signals. The optical signals may also be referred to as a "subject image". The lens position adjuster corresponds to, for example, an actuator that adjusts a position where an image is formed by the lens or lenses and a control circuit (controller) that controls a drive amount of the actuator. If the focal point of the one or the plurality of lenses is fixed, the lens position adjuster is not necessary. The image-forming optical system 201 may also be referred to as an optical system.

Imaging Device 203

The imaging device 203 includes a plurality of pixels, receives, with the individual pixels, the optical signals used to form the image by the image-forming optical system 201, and converts the optical signals into electric signals. The electric signals have a modulated image of the individual pixels. The imaging device 203 is located at a focal distance of the lens or lenses.

The imaging device 203 may include a plurality of pixels that receive light collected by the optical system and output a plurality of electric signals. The plurality of pixels and the plurality of electric signals may correspond to each other in a one-to-one relationship.

Color Filter 202

The color filter 202 is located on an optical path along which light that has entered from the image-forming optical system 201 reaches the imaging device 203. Typically, the color filter 202 is located so as to be in contact with a front surface of the imaging device 203. The "front surface" of the imaging device 203 may also be defined as an upper surface of the imaging device 203 or a light-receiving surface of the imaging device 203.

The color filter 202 is used to filter light in a plurality of wavelength bands that enters the imaging device 203. The color filter 202 has a light transmittance which differs according to certain positions at which the light in the plurality of wavelength bands is transmitted. Here, a "position" means the position of a small region having a predetermined area. The area of the small region is equal to, for example, the area of the light reception region of each pixel of the imaging device 203. The light transmittance also differs according to the wavelength bands of light that is transmitted. In this specification, a "position" on the color filter 202 is the position of a region associated with a pixel of the imaging device 203, as described above. For example, the plurality of pixels of the imaging device 203 include a first pixel and a second pixel. The plurality of wavelength bands include a first wavelength band, a second wavelength band, and a third wavelength band. For each of the first to third wavelength bands, a part of the color filter 202 corresponding to the first pixel has a light transmittance different from that of a part of the color filter 202 corresponding to the second pixel.

The plurality of pixels and the plurality of positions on the color filter 202 may correspond to each other in a one-to-one relationship. The plurality of positions may include a first position and a second position. The further details of the color filter 202 will be described below.

Transmission Circuit 103

The transmission circuit 103 transmits, to the image generation apparatus 12, a modulated image captured by the imaging device 203 and modulation information which is filter information set in the color filter 202. The transmission may be performed in either a wired or wireless manner.

In the embodiment, the transmission circuit 103 and the reception circuit 104 are provided and it is assumed that a process is performed in almost real time while a modulated image and modulation information are transmitted and received. Alternatively, a storage device (for example, a hard disk drive) for storing the modulated image and the modulation information may be provided and a process may be performed in non-real time.

Referring back to FIG. 1, a description will be given of the reception circuit 104, the color image generation circuit 105, and the output interface device 106 in the image generation apparatus 12.

Reception Circuit 104

The reception circuit 104 receives the modulated image and the modulation information output from the imaging apparatus 11. The communication between the reception circuit 104 and the transmission circuit 103 may be performed in either a wired or wireless manner. If the transmission circuit 103 transmits the modulated image and the modulation information in a wired manner, the reception circuit 104 may receive the modulated image and the modulation information in a wireless manner by using a device that converts wired communication into wireless communication, and vice versa.

Color Image Generation Circuit 105

The color image generation circuit 105 generates a color image by using the modulated image and the modulation information. The details of a process of generating a color image will be described below. The color image generation circuit 105 transmits the generated color image to the output interface device 106.

Output Interface Device 106

The output interface device 106 is an image output terminal. The output interface device 106 outputs a color image in the form of digital signals or analog signals to the outside of the image generation apparatus 12.

Next, the color filter 202 will be described in more detail with reference to FIGS. 3 to 6.

Figure 3:
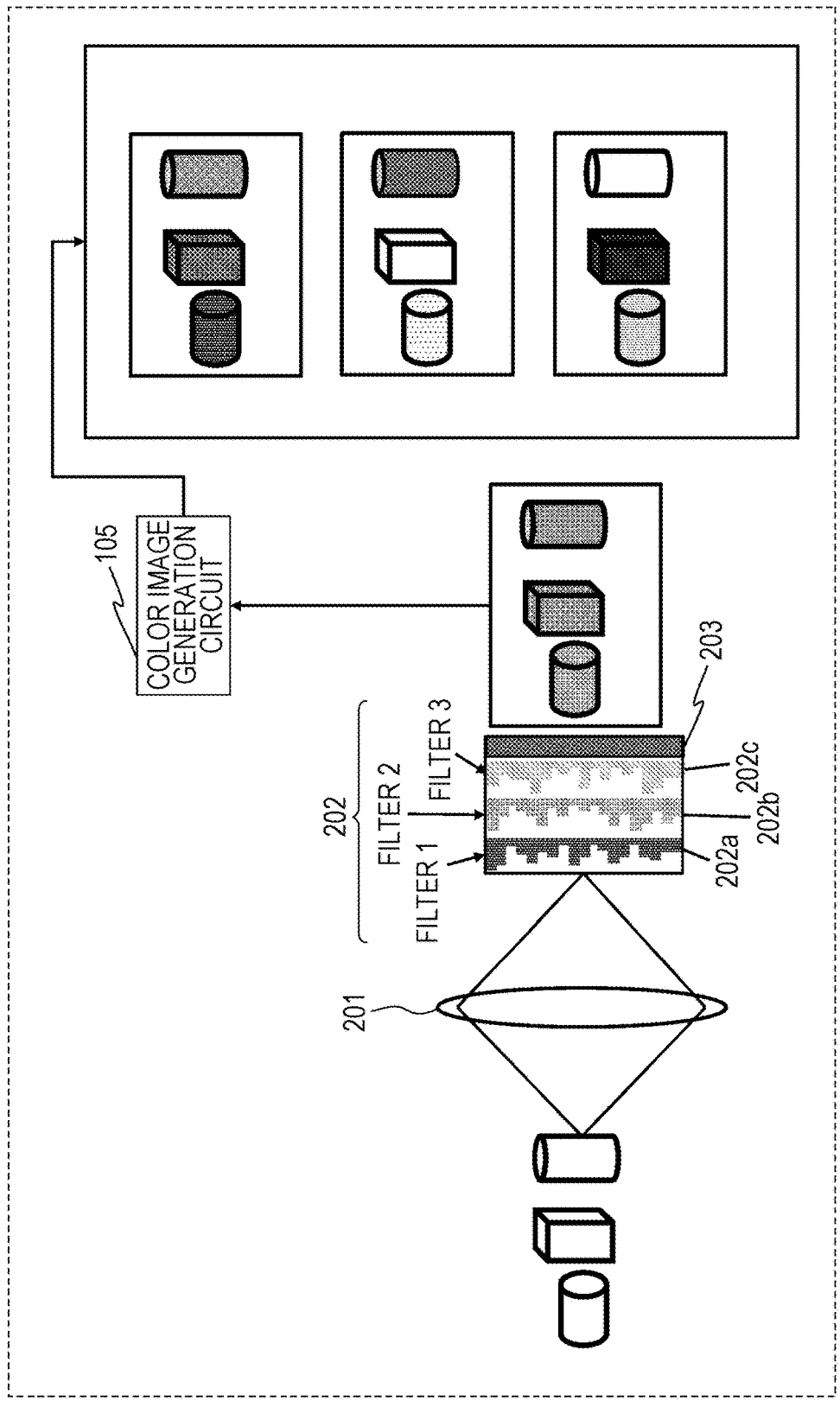
FIG. 3 schematically illustrates the imaging system including a color filter.

FIG. 3 schematically illustrates the imaging system 10 including the color filter 202. Hereinafter, attention is focused on the color filter 202.

As described above, the color filter 202 has a light transmittance which differs according to positions and according to wavelength bands. That is, at certain positions at which light in the plurality of wavelength bands is transmitted, a combination of transmittances in the individual wavelength bands varies. To achieve such an optical characteristic, the color filter 202 according to the embodiment includes a plurality of types of filters 1 to 3 each defining a wavelength band of light to be transmitted, and each filter has a thickness which differs according to positions. The "thickness" corresponds to the length of a cut-film (described below) of the filter along the direction parallel to the optical axis of transmitted light.

FIG. 3 illustrates a combination of three filters (filter 1, filter 2, and filter 3), but this is an example. The number of filters to be combined is not limited to three.

The filter 1 includes a cut-film 202a, the filter 2 includes a cut-film 202b, and the filter 3 includes a cut-film 202c. Each of the cut-films 202a to 202c is formed by stacking zero to a plurality of films each having a predetermined absorbance.

Figure 4:
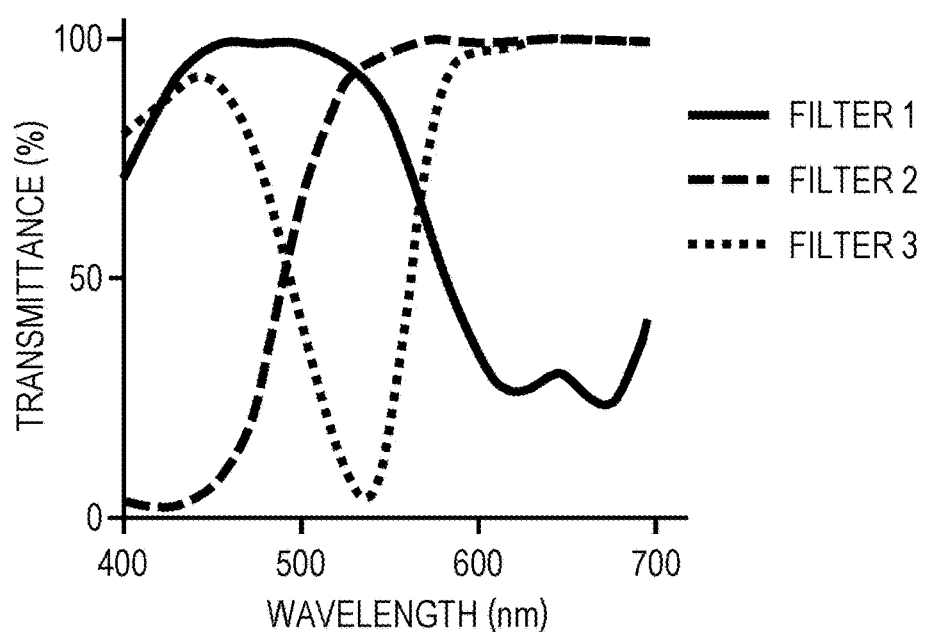
FIG. 4 is a diagram illustrating transmittances of filters, which is one of wavelength characteristics.

FIG. 4 illustrates the transmittances of the filters 1 to 3, which is one of wavelength characteristics.

The wavelength characteristics represent the reflectance, transmittance, and absorbance of each wavelength of incident light. The sum of reflected light, transmitted light, and absorbed light is equal to incident light. The ratio of transmitted light to incident light is called a "transmittance", and the ratio of absorbed light to incident light is called an "absorbance". The absorbance may be calculated by subtracting the amount of reflected light and transmitted light from the amount of incident light and dividing the result by the amount of incident light. FIG. 4 illustrates the relationship between the transmittances and wavelengths.

As will be described below, all the three filters forming the color filter 202 have wavelength characteristics in which, in a specific wavelength, the transmittance does not change even if the thickness changes, that is, the absorbance is 0%.

For example, the absorbance is 0% in a wavelength of around 450 nm in the filter 1, in a wavelength of around 580 nm in the filter 2, and in a wavelength of around 640 nm in the filter 3. In FIG. 4, the transmittance of the filter 1 is very high and almost 100% in a wavelength of around 450 nm, the transmittance of the filter 2 is very high and almost 100% in a wavelength of around 580 nm, and the transmittance of the filter 3 is very high and almost 100% in a wavelength of around 640 nm.

The filter 1 may be a color filter corresponding to the wavelength band of cyan (C), the filter 2 may be a color filter corresponding to the wavelength band of yellow (Y), and the filter 3 may be a color filter corresponding to the wavelength band of magenta (M).

The color filter 202 may include a plurality of cut-films. The plurality of cut-films may include a first cut-film and a second cut-film. The first cut-film may have a light transmittance in a first wavelength that is higher than light transmittances in wavelengths other than the first wavelength. The second cut-film may have a light transmittance in a second wavelength that is higher than light transmittances in wavelengths other than the second wavelength. The first wavelength may be different from the second wavelength. The thickness of the first cut-film at the first position may be different from the thickness of the first cut-film at the second position. The thickness of the second cut-film at the first position may be different from the thickness of the second cut-film at the second position. The first cut-film may have the characteristic of the filter 1 illustrated in FIG. 4, that is, the characteristic of a color filter corresponding to the wavelength band of cyan (C). The second cut-film may have the characteristic of the filter 2 illustrated in FIG. 4, that is, the characteristic of a color filter corresponding to the wavelength band of yellow (Y).

The first wavelength may be included in the range from 425 nm to 525 nm. The second wavelength may be included in the range from 550 nm to 700 nm. The wavelengths other than the first wavelength may be included in the range from 400 nm to 700 nm. The wavelengths other than the second wavelength may be included in the range from 400 nm to 700 nm.

In this specification, an absorbance of 0% is ideal, and absorbances other than 0% are not excluded. The cut-films 202a to 202c according to the embodiment function even if the absorbance is several %. For example, an absorbance of 0 to 2% may actually be regarded as an absorbance of 0%. Also, a transmittance of 100% is ideal. A transmittance of 98 to 100% may be regarded as a transmittance of 100%.

As illustrated in FIG. 3, the filters 1 to 3 are stacked in order. Regarding the filter 3, for example, a portion where the cut-film 202c does not exist may be filled with an optical member that does not substantially affect the transmittance or absorbance in a transmission wavelength, so as to support the filter 2 stacked thereon. The same applies to the other filters 1 and 2. Accordingly, the optical characteristics of the individual cut-films 202a to 202c determine the optical characteristics of the individual filters 1 to 3.

Here, it is assumed that the transmittance of the cut-film 202a of the filter 1 is represented by $C1(\lambda)$, the transmittance of the cut-film 202b of the filter 2 is represented by C2(λ), and the transmittance of the cut-film 202c of the filter 3 is represented by C3(λ), regarding a wavelength λ. Also, it is assumed that the thickness of the cut-film 202a at a position (u, v) is represented by T1(u, v), the thickness of the cut-film 202b at the position (u, v) is represented by T2(u, v), and the thickness of the cut-film 202c at the position (u, v) is represented by T3(u, v). In this case, the wavelength characteristics at the position (u, v) can be expressed by the following formula. To simplify the description, the thickness of a cut-film is referred to as "the thickness of a filter" for convenience.

$$x(\lambda,u,x)=\Phi(C1(\lambda),T1(u,v))\cdot\Phi(C2(\lambda),T2(u,v))\cdot\Phi(C3(\lambda),T3(u,v)).$$  Formula 1

Note that $\Phi(C(\lambda), T(u, v))$ represents a function indicating the transmittance of light in a wavelength λ determined by the wavelength characteristic C(λ) of the filter and the thickness T(u, v) of the filter. Also, $\Phi(C(\lambda), T(u, v))$ is a function that takes a fixed value when the absorbance included in C(λ) is 0 or when T(u, v) is 0. Normally, the transmittance decreases as the thickness of the filter increases. However, when the absorbance of the filter is 0, the transmittance takes a fixed value regardless of the thickness of the filter. The transmittance takes a fixed value also when no filter is located (T(u, v)=0). In this way, since the filter thickness differs according to positions, a color filter having a transmittance which differs according to wavelength bands and according to pixels of the imaging device 203 can be obtained. In this case, on the individual cut-films of the color filter 202, a set $x_i$ (i is an integer of 1 to n) of transmittances at n positions and a set $y_i$ (i is an integer of 1 to n) of transmittances at other n positions have a correlation coefficient of about 0 to 0.2. That is, there is no correlation between these sets.

The correlation coefficient can be calculated by dividing the covariance of the sets $x_i$ and $y_i$ by the respective standard deviations. Specifically, the correlation coefficient ρ can be calculated by using the following formula.

$$\rho = \frac{\sum_{i=1}^{n}(x_i-\bar{x})(y_i-\bar{y})}{\sqrt{\left\{\sum_{i=1}^{n}(x_i-\bar{x})^2\right\}\left\{\sum_{i=1}^{n}(y_i-\bar{y})^2\right\}}}$$  Formula 2

The color filter 202 and the Bayer CFA (FIG. 15) are compared with each other to make the difference therebetween clear. For example, attention is focused on the pixels in the Bayer CFA through which light with a red wavelength is transmitted (R pixels). In the Bayer CFA, all the R pixels have identical wavelength characteristics. Thus, the correlation coefficient of the transmittance of the R pixels is always 1.

Next, attention is focused on the filter 3 of the color filter 202, through which light with a red wavelength is mainly transmitted. The cut-film of the filter 3 has a thickness and wavelength characteristic which differ according to positions, as described above. Even at the vicinity of a certain position, the wavelength characteristic differs at different positions. Thus, the correlation coefficient of the transmittance at individual positions of the filter 3 is always less than 1. From this point of view, the individual cut-films of the color filter 202 are greatly different from the Bayer CFA.

If a certain range including pixels of all the colors in the Bayer CFA filter is set and if the correlation coefficient of the transmittance of the pixels in the range is calculated, the result is less than 1. However, the correlation coefficient is constant. On the other hand, if a similar range is set to the color filter 202 including all the cut-films and if the correlation coefficient of the transmittance at positions within the range on the color filter 202 is calculated, the value is not constant.

Here, the thickness of each filter is set so as to have a uniform distribution ranging from a thickness of 0% (no filter) to a maximum thickness of 100%.

Figure 5:
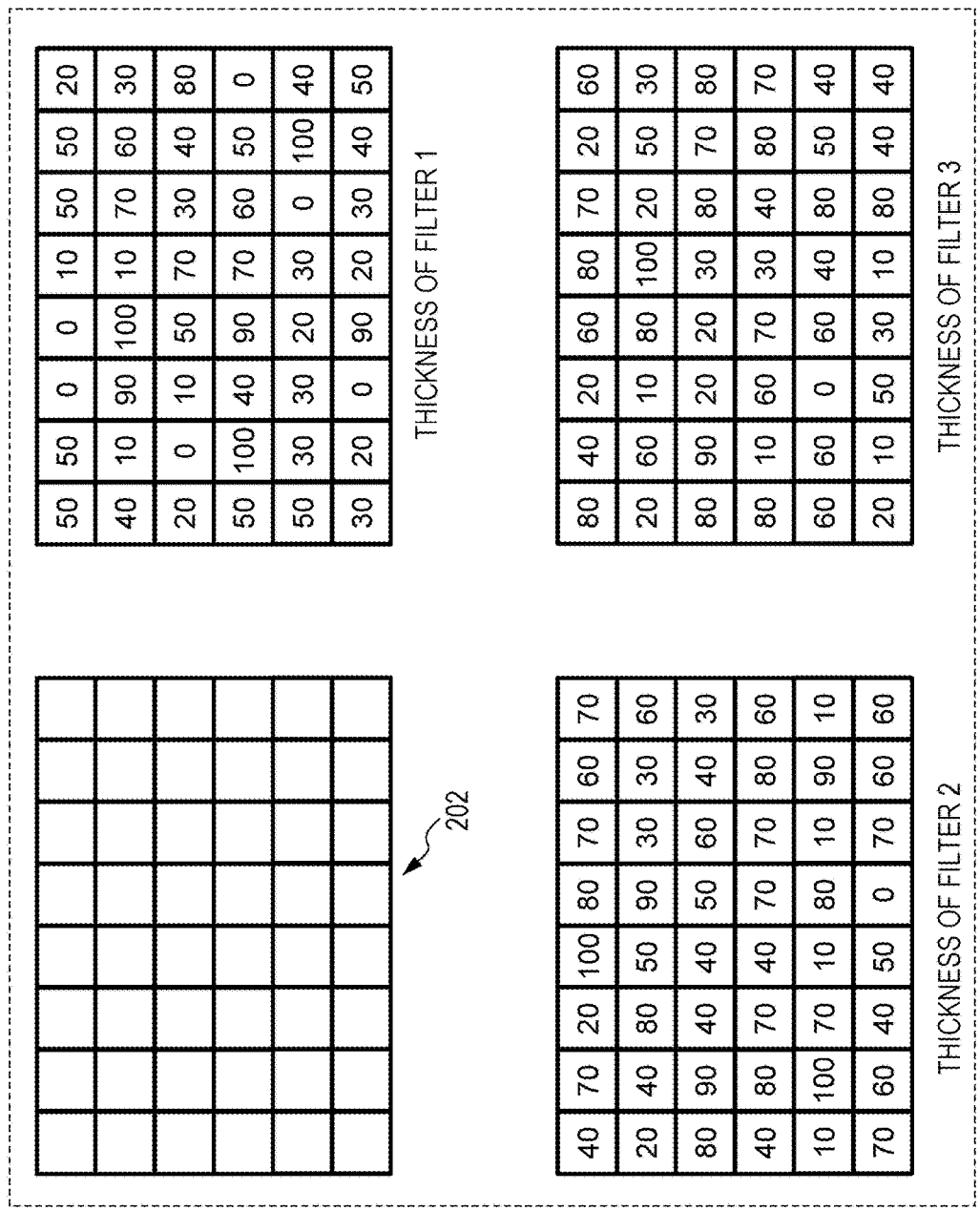
FIG. 5 is a diagram illustrating an example in which the thicknesses of the individual filters at individual pixels are set in accordance with a uniform distribution.

FIG. 5 illustrates an example in which the thicknesses of the individual filters at individual pixels are set in accordance with a uniform distribution. In FIG. 5, the filters 1 to 3 are illustrated with percentages of the thicknesses of the filters relative to a maximum thickness of 100. With such a color filter 202 being adopted, in which each filter has a thickness which differs according to pixels, a transmittance which differ according to wavelengths and according to pixels can be obtained in accordance with Formula 1. In the case of the Bayer CFA described in U.S. Pat. No. 5,629,734 or the random filter arrangement described in Japanese Unexamined Patent Application Publication (Translation of PCT Application) No. 2013-511924, the wavelength characteristics differ among R, G, and B pixels, but the transmittance is constant. In other words, even in the random filter arrangement described in Japanese Unexamined Patent Application Publication (Translation of PCT Application) No. 2013-511924, the transmittance is constant in each wavelength. With the above-described configuration of the color filter 202, random sampling with uniform random numbers can be performed not only in individual pixels but also in individual wavelengths.

Of course, the thickness of each filter is not limited to uniform random numbers. For example, the thickness may be set in accordance with a normal distribution (Gaussian distribution) with a thickness of 50% being an average.

Figure 6:
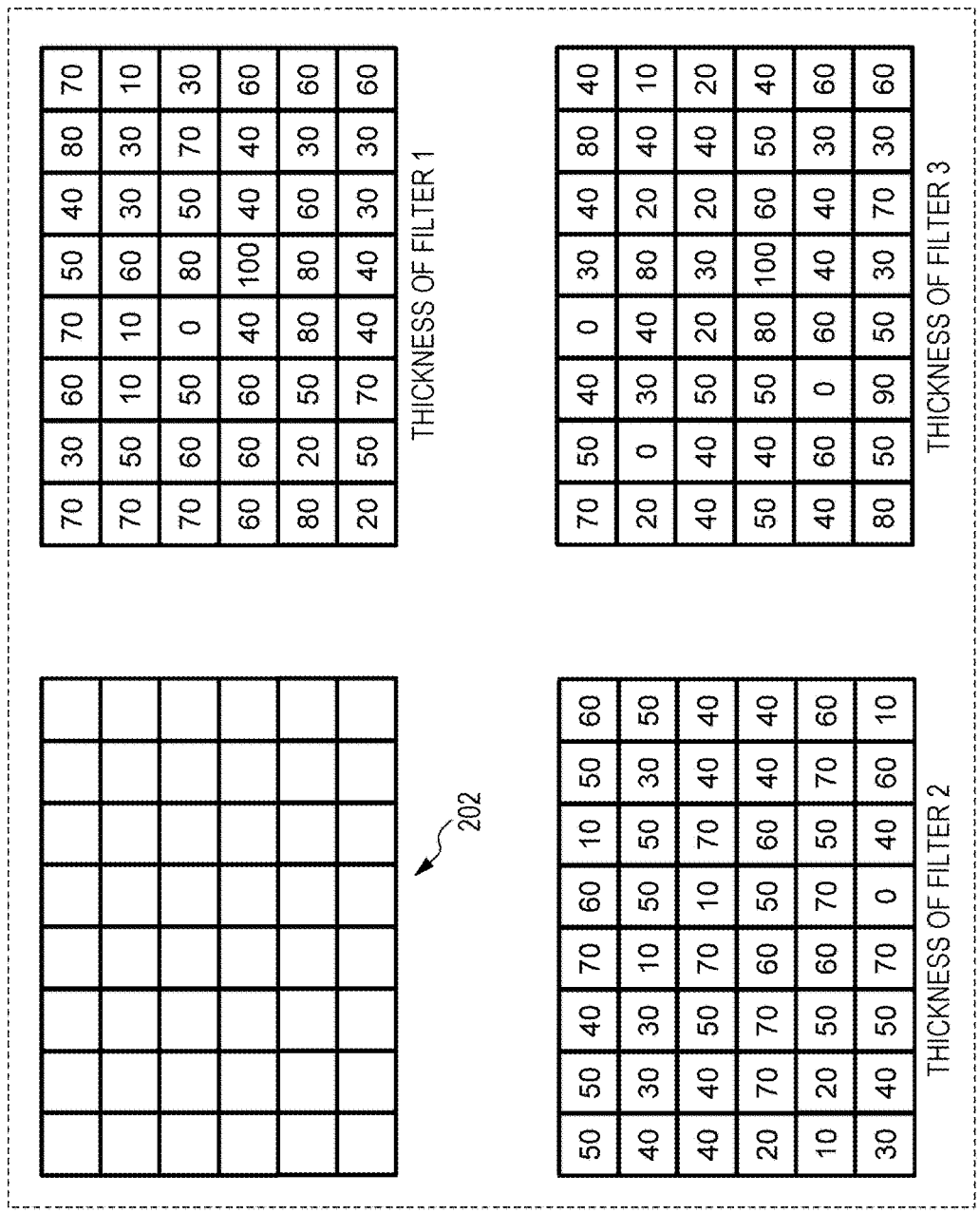
FIG. 6 is a diagram illustrating an example in which the thicknesses of the individual filters at individual pixels are set in accordance with a normal distribution.

FIG. 6 illustrates an example in which the thicknesses of the individual filters at individual pixels are set in accordance with a normal distribution. Also in FIG. 6, the filters 1 to 3 are illustrated with percentages of the thicknesses of the filters relative to a maximum thickness of 100. In this way, random sampling with normal random numbers can be performed in individual wavelengths.

The thickness of each filter of the color filter 202 does not necessarily differ according to pixels. For example, the color filter 202 may be formed using liquid crystal or a spatial light modulator. The spatial light modulator is an optical device that modulates a transmittance spatially and temporally, and is able to cause the transmittance to differ according to pixels.

Figure 7:
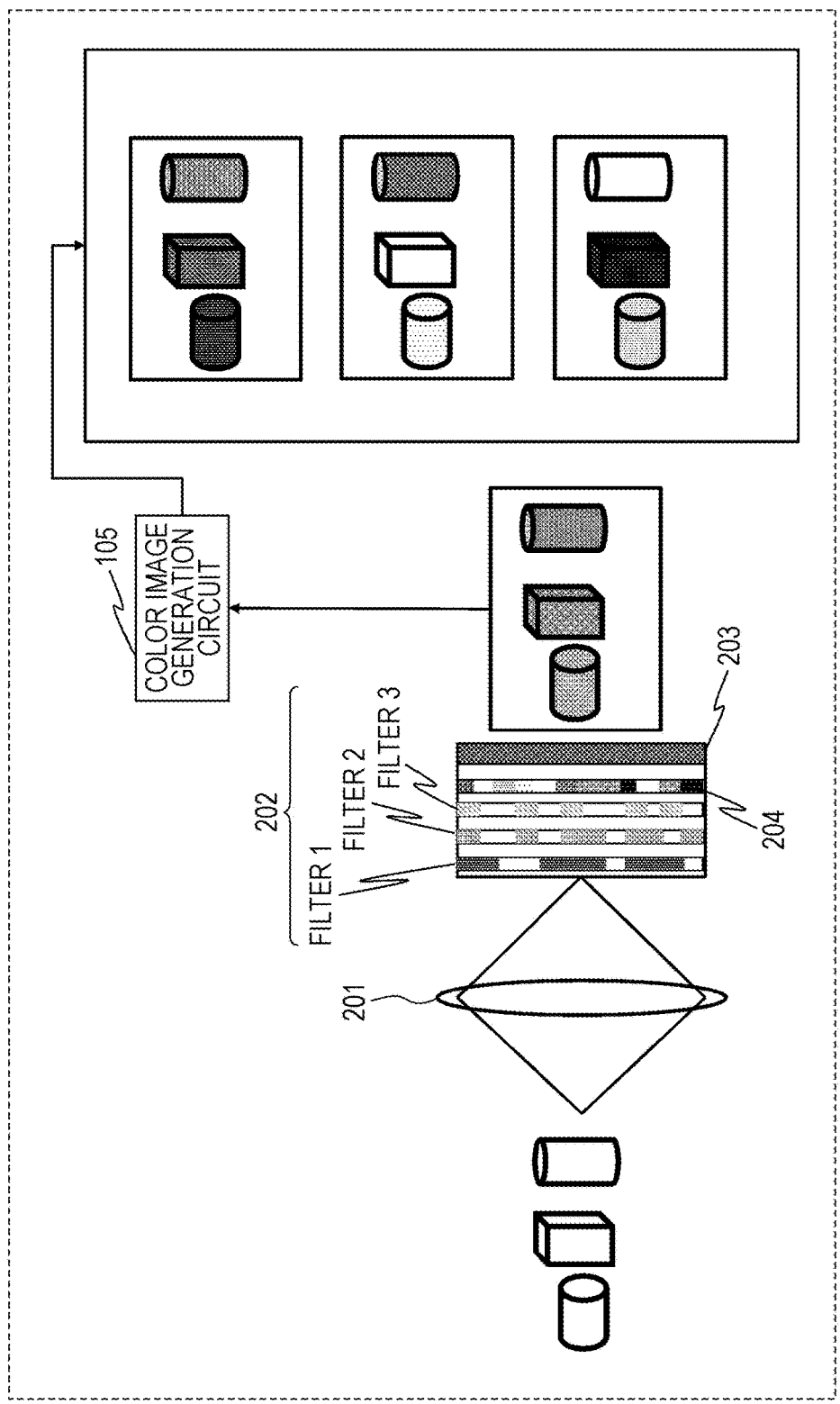
FIG. 7 is a diagram illustrating a modification example of the imaging system that causes the transmittance to differ according to pixels by using a spatial light modulator.

FIG. 7 illustrates a modification example of the imaging system 10 that causes the transmittance to differ according to pixels by using a spatial light modulator 204. The color filter 202 is formed of the filters 1 to 3 and the spatial light modulator 204. Each of the filters 1 to 3 includes pixels for which the filter is set and pixels for which the filter is not set. In the filter 1, a case where the filter is set for the pixel (u, v) is expressed by M1(u, v)=1, whereas a case where the filter is not set for the pixel (u, v) is expressed by M1(u, v)=0. Likewise, in the filter 2, a case where the filter is set for the pixel (u, v) is expressed by M2(u, v)=1, whereas a case where the filter is not set for the pixel (u, v) is expressed by M2(u, v)=0. Also, in the filter 3, a case where the filter is set for the pixel (u, v) is expressed by M3(u, v)=1, whereas a case where the filter is not set for the pixel (u, v) is expressed by M3(u, v)=0. The transmittance of the spatial light modulator 204 in the pixel (u, v) is represented by S(u, v). In this case, the wavelength characteristics at the pixel position (u, v) are expressed by the following formula.

$$x(\lambda,u,x)=P(C1(\lambda),M1(u,v))\cdot P(C2(\lambda),M2(u,v))\cdot P(C3(\lambda),M3(u,v))\cdot S(u,v)). \quad \text{Formula 3}$$

Note that P is a function that determines a transmittance in accordance with whether or not each filter is set and is expressed by the following formula.

$$P(C, M) = \begin{cases} 1; & M = 0, \\ C; & M \neq 0. \end{cases} \quad \text{Formula 4}$$

In this way, with a combination of the plurality of filters and the spatial light modulator 204, a color filter having a transmittance in wavelength bands which differs according to the pixels of the imaging device 203 can be obtained.

Of course, the color filter 202 illustrated in FIG. 3 and the spatial light modulator 204 can be combined together.

Figure 8:
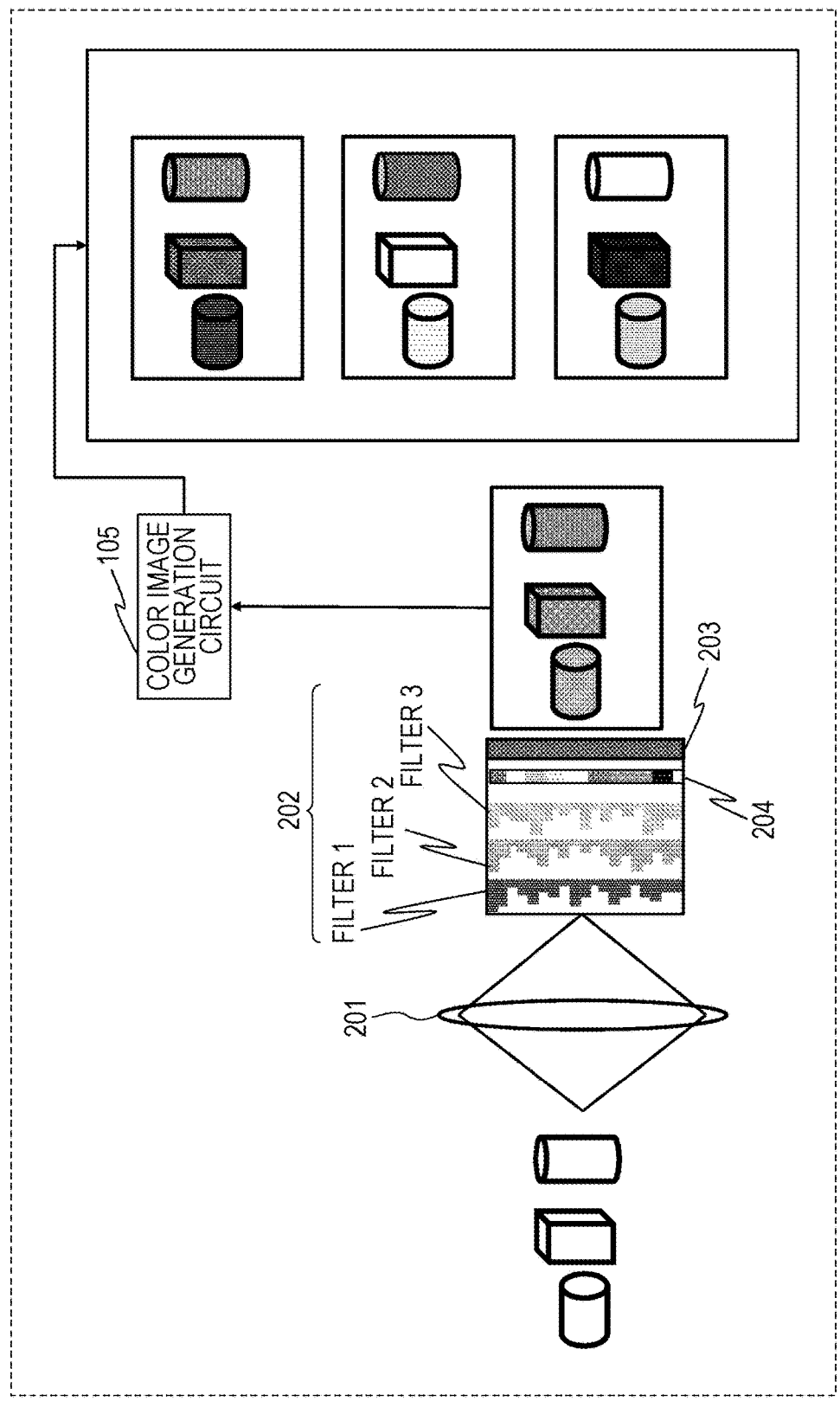
FIG. 8 is a diagram illustrating another modification example of the imaging system that causes the transmittance to differ according to pixels by using a combination of the spatial light modulator and a plurality of filters in which the transmittance differs according to thickness of the filter.

FIG. 8 illustrates another modification example of the imaging system 10 that causes the transmittance to differ according to pixels by using a combination of the spatial light modulator 204 and a plurality of filters in which the transmittance differs according to the thicknesses thereof. In this case, the wavelength characteristics at the pixel position (u, v) are expressed by the following formula.

$$x(\lambda,u,x)=\Phi(C1(\lambda),T1(u,v))\cdot\Phi(C2(\lambda),T2(u,v))\cdot\Phi(C3(\lambda),T3(u,v))\cdot S(u,v). \quad \text{Formula 5}$$

Next, the image generation apparatus 12 (FIG. 1) will be described.

Figure 9:
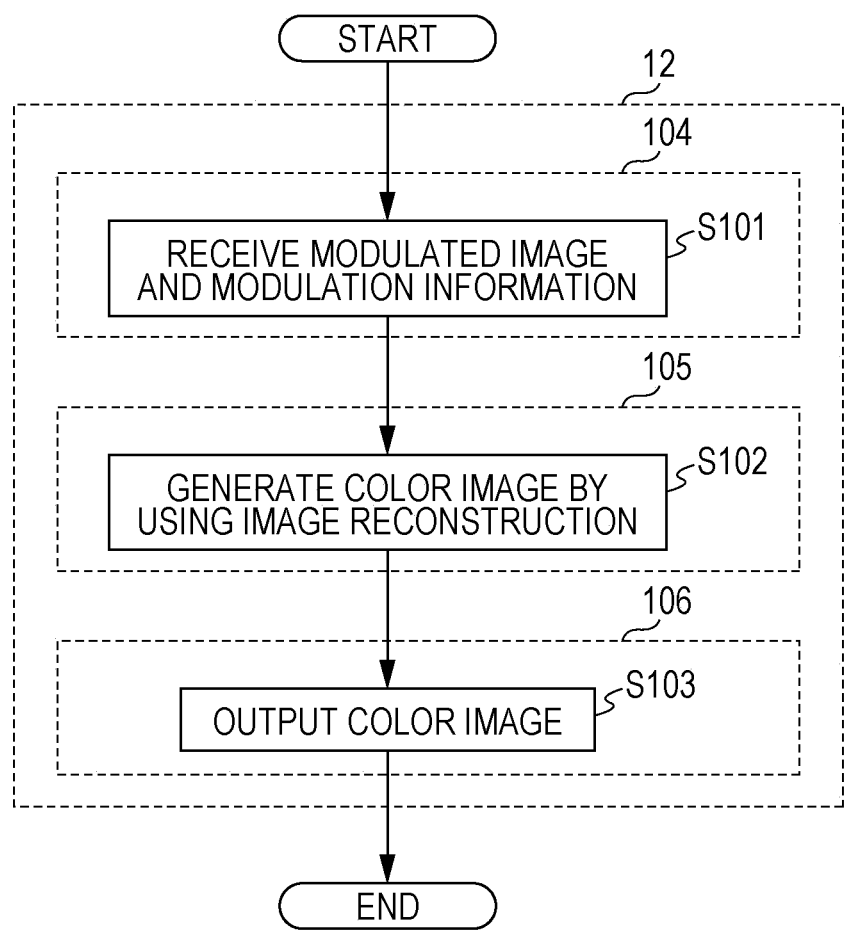
FIG. 9 is a flowchart illustrating a procedure of a main process performed by an image generation apparatus.

FIG. 9 is a flowchart illustrating a procedure of a main process performed by the image generation apparatus 12.

In step S101, the reception circuit 104 of the image generation apparatus 12 receives a modulated image and modulation information transmitted by the transmission circuit 103.

In step S102, the color image generation circuit 105 generates a color image from the modulated image and modulation information by using an image reconstruction technique (for example, the compressed sensing technique).

Hereinafter, this process will be described in more detail. The process of generating a color image can be expressed by the following formula when a modulated image that has been captured is represented by y and an image to be generated is represented by x.

$$y=Ax. \quad \text{Formula 6}$$

Here, the matrix A is a sampling matrix determined by modulation information. The sampling matrix A represents the relationship between the modulated image y that has been captured and the color RGB image x to be generated.

Hereinafter, a method for obtaining the sampling matrix A will be described. Here, a method of using color calibration using Macbeth ColorChecker will be described. Macbeth ColorChecker is 24 color samples based on the Munsell color system, in which XYZ values and sRGB values of the individual color samples are predetermined.

Here, a modulation luminance value in a certain pixel i (i=1, 2, 3, . . . , and N) of an image of the 24 color samples j captured by the color imaging apparatus according to the embodiment is represented by l(j, i) (j=1, 2, 3, . . . , and 24), and the sRGB value of each color sample is represented by R'(j), G'(j), and B'(j). In this case, the following relational expression is satisfied.

$$c(1,i)\cdot R(j)+c(2,i)\cdot G(j)+c(3,i)\cdot B(j)=I(j,i), j=1,2,\ldots,24 \quad \text{Formula 7}$$

Note that c(x, i) (x=1, 2, and 3) represents an element in the i row and the (3(i−1)+x) column of the sampling matrix A. The elements other than the element in the i row and the (3(i−1)+x) column (i=1, 2, 3, . . . , and x=1, 2, and 3) of the sampling matrix A are 0. R(j), G(j), and B(j) are obtained by linearly converting R'(j), G'(j), and B'(j), specifically by using the following formula.

$$R(j)=\{(R'(j)/255+0.055)/1.055\}^{2.4}\times 255,$$

$$G(j)=\{(G'(j)/255+0.055)/1.055\}^{2.4}\times 255,$$

$$B(j)=\{(B'(j)/255+0.055)/1.055\}^{2.4}\times 255. \quad \text{Formula 8}$$

Formula 7 can be solved by using the least squares method because the number of unknowns (c (x, i)) is 3 and the number of equations is 24 for a certain pixel i. This process is performed on all the pixels i and thereby the sampling matrix A can be obtained.

To simplify the description, it is assumed that the number N of pixels of the imaging device 203 is 16. FIG. 10 is a schematic diagram illustrating a modulated image and generated images in which the number N of pixels is 16. In FIG. 10, (a) illustrates a modulated image, (b) illustrates a generated R image, which is a red (R) channel of a generated color image, (c) illustrates a generated G image, which is a green (G) channel of the generated color image, and (d) illustrates a generated B image, which is a blue (B) channel of the generated color image. In Formula 6, y and x are as follows.

$$y=[y_1\ y_2\ y_3\ \ldots\ y_{16}]^T.$$

$$X=[r_1\ g_1\ b_1\ r_2\ g_2\ b_2\ r_3 g_3\ b_3\ \ldots\ r_{16}\ g_{16}\ b_{16}]^T. \quad \text{Formula 9}$$

As is clear from this formula, Formula 6 is an ill-posed problem because the number of elements of y, which is the number of observations, is small of 16 relative to the number of elements of x, which is 48 and is the number of unknowns.

To solve this ill-posed problem, the compressed sensing technique is used. The compressed sensing technique is a technique of compressing data through an addition process (encoding) at the time of signal sensing and decoding the original signal by performing a reconstruction process later by using the compressed data. In the compressed sensing process, prior knowledge is used to solve the ill-posed problem. As the prior knowledge for a natural image, the following may be used: total variation, which is the sum of absolute values of change in intensity compared to the vicinity on an image (see, for example, Rudin L. I., Osher S. J., and Fatemi E.: Nonlinear total variation based noise removal algorithms. Physica D, vol. 60, pp. 259-268, 1992, and Shunsuke Ono, Isao Yamada, "Decorrelated Vectorial Total Variation", IEEE Conference on Computer Vision and Pattern Recognition, 2014); sparsity in which many coefficients are 0 in linear conversion such as wavelet transform, discrete cosine transform (DCT), or curvelet transform (see, for example, J. Ma, "Improved Iterative Curvelet Thresholding for Compressed Sensing and Measurement", IEEE Transactions on Instrumentation & Measurement, vol. 60, no. 1, pp. 126-136, 2011); and dictionary learning in which conversion coefficients of the above-mentioned linear conversion are obtained through leaning (see, for example, M Aharon, M. Elad, and A. M. Bruckstein, "K-SVD: An Algorithm for Designing Overcomplete Dictionaries for Sparse Representation", IEEE Transactions on Image Processing, vol. 54, no. 11, pp. 4311-4322, 2006).

Here, a description will be given of decorrelated vectorial total variation, which is a method classified as a kind of total variation. This method suppresses the occurrence of an artifact called false color by separately calculating the gradient of a luminance component and that of a chrominance component of a color image. This is implemented by minimizing the following evaluation function.

$$\arg\min_{x \in [0,255]^{3 \times N}} J(x) + \|Ax - y\|_2^2 : \quad \text{Formula 10}$$

This evaluation function is formed of the following three terms.
1. Data fidelity term $\|Ax-y\|_2^2$: a constraint term for satisfying Formula 6.
2. Intensity range constraint term: the range of x for calculating a minimum value min (x is [0.255] 3×N): a constraint term for making the pixel value 0 or more and 255 or less.
3. Decorrelated vectorial total variation term J(x): a total variation term in which the gradient of a luminance component and that of a chrominance component of a color image are separated.

Here, the following formula 11 is satisfied.

$$J: R^{3N} \to R_+ : x \mapsto \|DCx\|_{1,2}^{(w,2,4)}$$

Note that $$x = [x_R^T \ x_G^T \ x_B^T]^T \in R^{3N},$$

C represents orthogonal color conversion:

$$R^{3N} \to R^{3N}: x \mapsto [x_1 \ x_2 \ x_3],$$

$$x_1 = \frac{1}{\sqrt{3}}(x_R + x_G + x_B),$$

$$x_2 = \frac{1}{\sqrt{2}}(x_R - x_B),$$

$$x_3 = \frac{1}{\sqrt{6}}(x_R - 2x_G + x_B),$$

$D=\text{diag}(D_1 \ D_1 \ D_1) \in R^{6N \times 3N}$ is a first-order gradient operator in a color image,
$D_1 = [D_v^T \ D_h^T]^T \in R^{2N \times N}$ is a first-order gradient operator of each channel,
$D_v, D_h \in R^{N \times N}$ is a vertical/horizontal first-order gradient operator (Neumann boundary), $$\|\cdot\|_{1,2}^{(w,k_1,k_2)}: R^{(k_1 k_2)N} \to R_+ : x \mapsto w\|x_1\|_{1,2}^{(k_1)} + \|x_2\|_{1,2}^{(k_2)},$$

$$\|\cdot\|_{1,2}^{(k)}: R^{kN} \to R_+ : x \mapsto \Sigma_{i=1}^{N} \sqrt{\Sigma_{j=0}^{k-1} x_{i+jN}^2},$$

$x_i$ represents the i-th element of x,
$x = [x_1^T \ x_2^T]^T$, $x_1 \in R^{k_1 N}$, $x_2 \in R^{k_2 N}$, and $w \in (0,1)$.
R is a real number and R+ is a non-negative real number.

Figure 11:
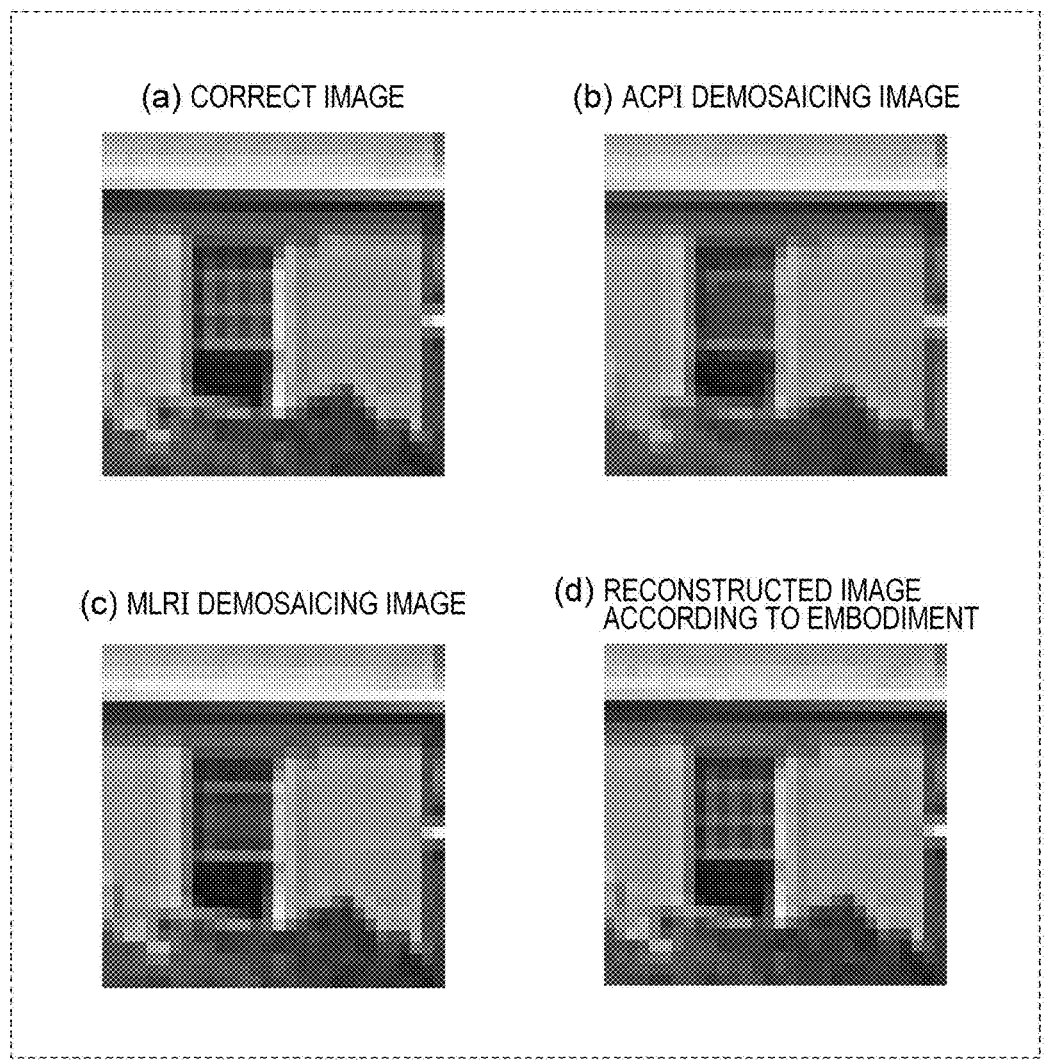
FIG. 11 is a diagram illustrating R images.
Figure 12:
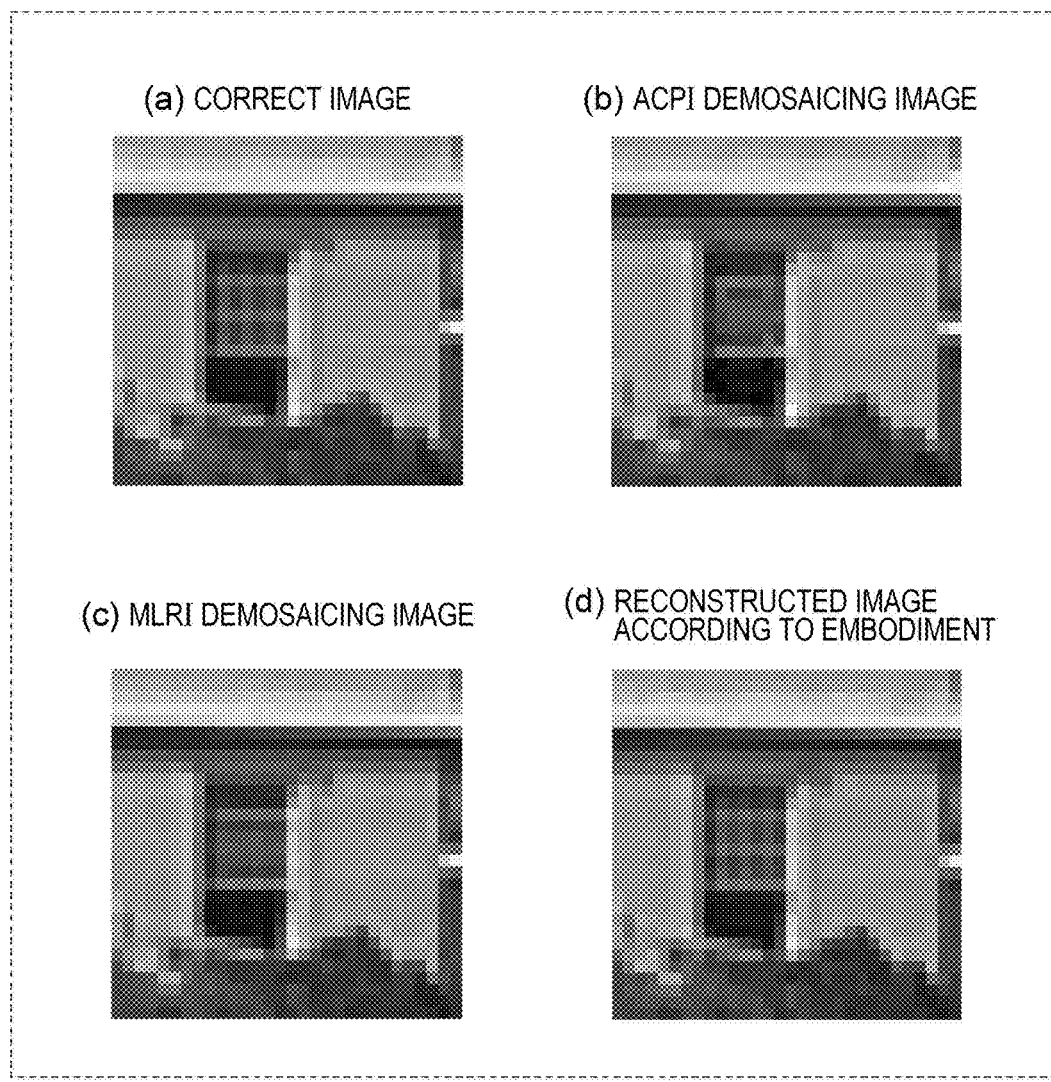
FIG. 12 is a diagram illustrating G images.
Figure 13:
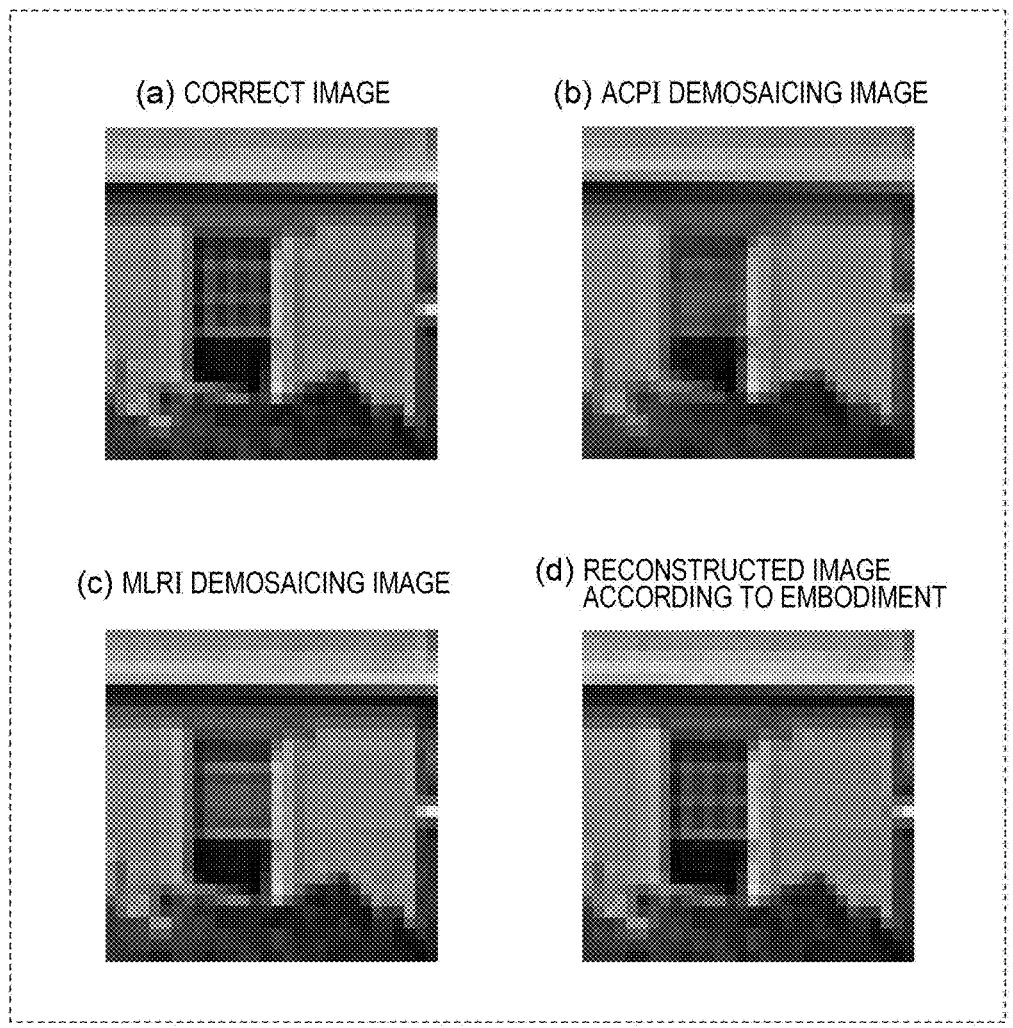
FIG. 13 is a diagram illustrating B images.

FIGS. 11 to 13 illustrate an example of color images of individual colors generated by the color image generation circuit 105 according to the embodiment. FIG. 11 illustrates R images, FIG. 12 illustrates G images, and FIG. 13 illustrates B images. The inventors actually generated and compared color images. In the present application, the images are illustrated by using luminance values of the individual images.

In each of these figures, (a) illustrates a correct color image captured by using a three-chip camera, (b) illustrates a demosaicing image generated by using an adaptive color plane interpolation (ACPI) method, which is a typical demosaicing method, described in U.S. Pat. No. 5,629,734, (c) illustrates a demosaicing image generated by using a minimized-laplacian residual interpolation (MLRI) method described in D. Kiku, Y. Monno, M. Tanaka and M. Okutomi, "Minimized-Laplacian residual interpolation for color image demosaicking", IS & T/SPIE Electronic Imaging (EI), 2014, and (d) illustrates a reconstructed image generated by the color image generation circuit 105 according to the embodiment.

Hereinafter, a description will be given with reference to FIG. 11 as an example. The same description may apply to FIGS. 12 and 13.

Hereinafter, attention is focused on the window with a lattice pattern at the center of (a) of FIG. 11.

In FIG. 11, (b) and (c) are images captured in accordance with the Bayer CFA according to the related art illustrated in FIG. 15. The inventors performed verification and determined that the ACPI demosaicing image illustrated in (b) of FIG. 11 includes an artifact called false color near the edge. Specifically, the inventors actually determined that false color exists at an edge portion of the window. The inventors also determined that such false color does not exist in the reconstructed image according to the embodiment illustrated in (d) of FIG. 11.

In the MLRI demosaicing image illustrated in (c) of FIG. 11, high-frequency components such as the lattice pattern of the window are not reconstructed. On the other hand, it can be understood that the color image generation circuit 105 according to the embodiment is capable of reconstructing the high-frequency region without causing an artifact, compared to the related art.

Figure 14:
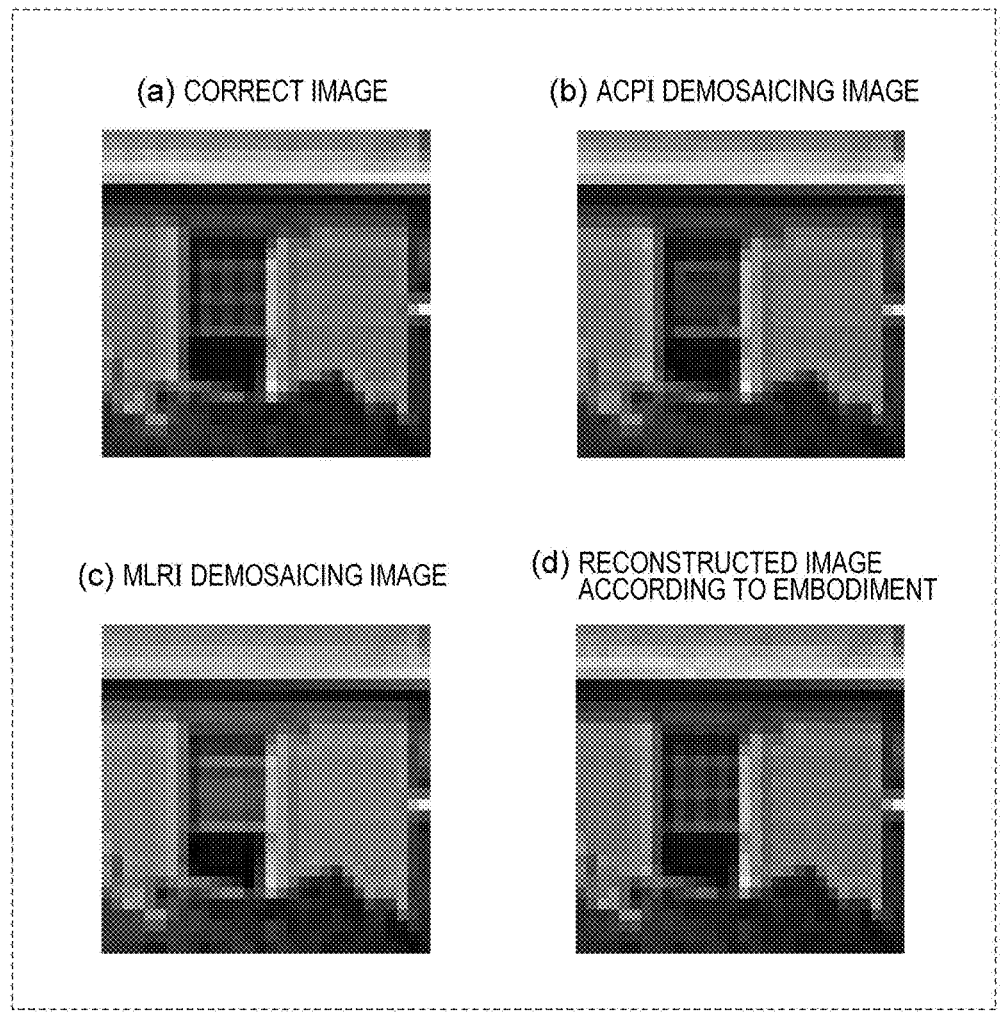
FIG. 14 is a diagram illustrating an example of color images including all colors.

FIG. 14 is an example of color images including all color channel images. FIG. 14 is illustrated by using luminance values of the color channel images. As is clear from the lattice pattern of the window, the reconstructed image generated in the embodiment is the most similar to the correct image.

The output interface device 106 displays a color image generated by the color image generation circuit 105 on a display and outputs the color image so as to be used in image processing for human detection or the like (step S103).

If the signal received by the imaging device 203 is saturated, Formula 6 is not satisfied and the data fidelity term in Formula 10 becomes a cause of degrading the quality of a reconstructed image. Thus, the color image generation circuit 105 changes the data fidelity term in Formula 10 for saturated pixels so as to improve the quality of the reconstructed image. This may be implemented by changing the second term of Formula 10 in the following manner.

$$\sum_{i \in NS} \|a_i^T x - y_i\|_2^2 + \sum_{i \in S} fs(a_i, x, y_i) \quad \text{Formula 12}$$

Here, the second term is a data fidelity term for saturated pixels and is called saturation constraint. Here, $$y_i (i \in NS) \quad \text{Formula 13}$$

represents a non-saturated pixel of the modulated image y that has been captured, $$y_i (i \in S) \quad \text{Formula 14}$$

represents a saturated pixel of the modulated image y that has been captured, and $$a_i \quad \text{Formula 15}$$

represents a vector obtained by transposing the i-th row of the sampling matrix A.

Furthermore, $$fs(a_i, x, y_i) = \begin{cases} 0 & \text{if } a_i^T x \geq y_i \\ \infty & \text{else} \end{cases} \quad \text{Formula 16}$$

is a function that returns 0 if the value calculated by multiplying an estimated value x by the sampling matrix A is saturated, that is, yi or more, and returns ∞ otherwise. Here, the proximity operator of Formula 16 is expressed by the following formula.

$$prox(fs(a_i^T x, y_i)) = \begin{cases} x & \text{if } a_i^T x \geq y_i \\ x + \dfrac{y_i - a_i^T x}{\|a_i\|_2^2} \cdot a_i & \text{else} \end{cases} \quad \text{Formula 17}$$

Thus, the solution can be obtained by using the method of convex optimization such as alternating direction method of multipliers (ADMM) (see Manya V. Afonso, José M. Bioucas-Dias, and Mário A. T. Figueiredo, "Fast Image Recovery Using Variable Splitting and Constrained Optimization", IEEE Transactions on Image Processing, VOL. 19, NO. 9, pp. 2345-2356, 2010).

Figure 16:
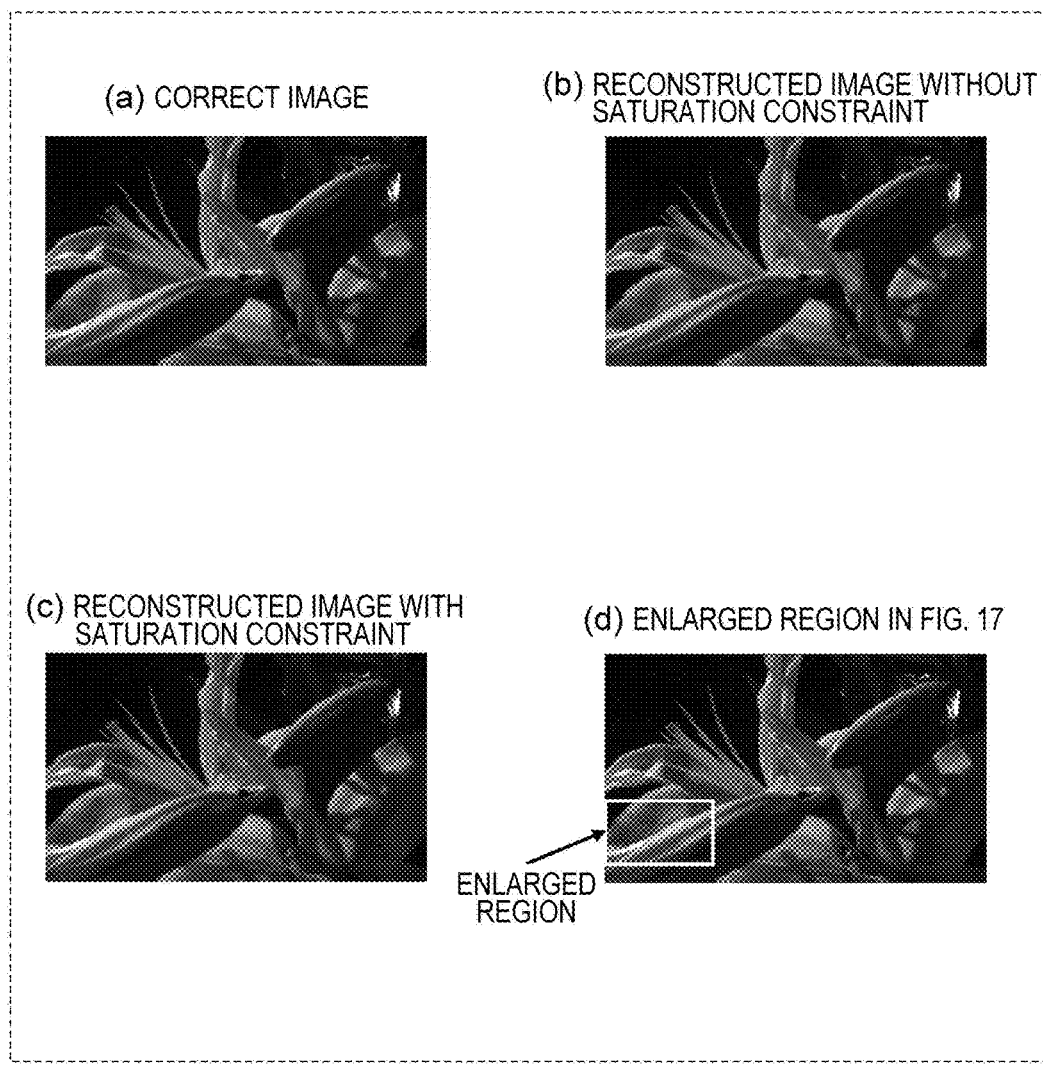
FIG. 16 illustrates an example of G images in a color image generated by a color image generation circuit according to the embodiment.
Figure 17:
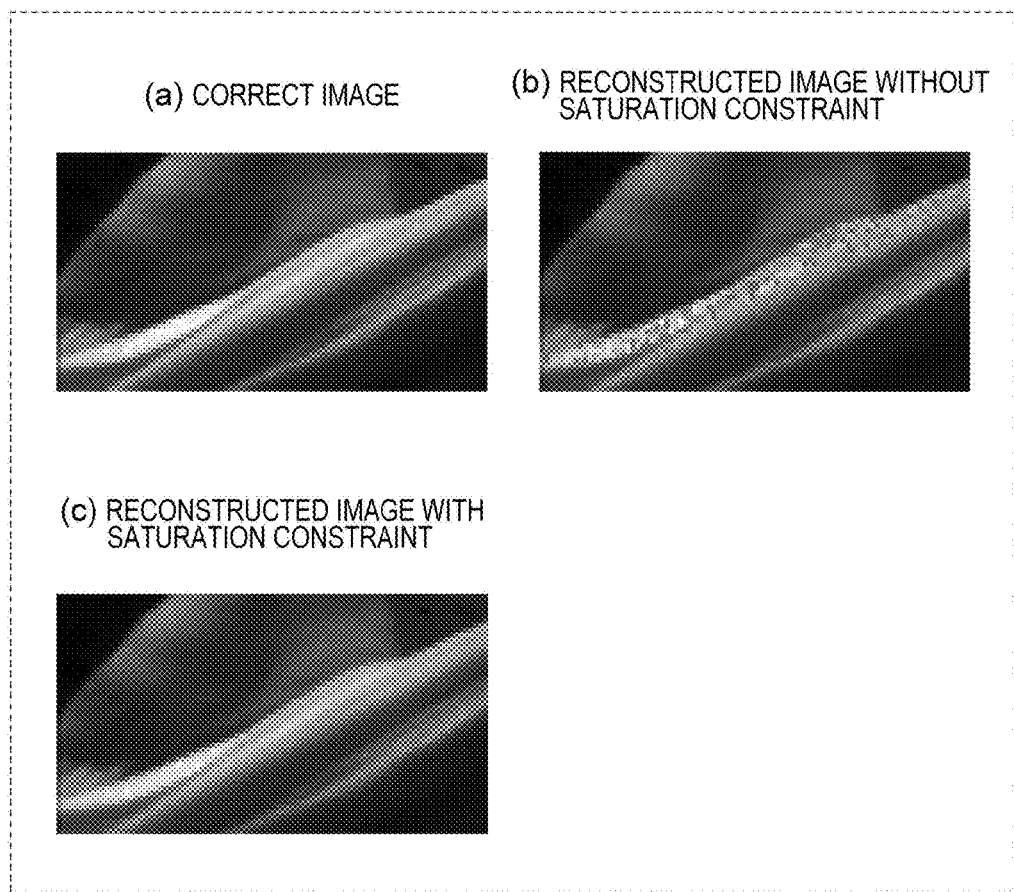
FIG. 17 illustrates an example of enlarged images of a portion of the images illustrated in (a) to (c) of FIG. 16.

FIGS. 16 and 17 illustrate an example of color images generated by the color image generation circuit 105 according to the embodiment. Here, G images are illustrated. The inventors actually generated and compared color images. In the present application, the images are illustrated by using luminance values of the G images.

In these figures, (a) of FIG. 16 illustrates a correct image captured by a three-chip camera, (b) of FIG. 16 illustrates an image reconstructed by using the evaluation function expressed by Formula 10, that is, a reconstructed image without saturation constraint, and (c) of FIG. 16 illustrates an image reconstructed by changing the second term in the evaluation function expressed by Formula 10 to Formula 12, that is, a reconstructed image with saturation constraint. In addition, (a) to (c) of FIG. 17 illustrate enlarged images of the "enlarged region" illustrated in (d) of FIG. 16, corresponding to the images (a) to (c) of FIG. 16, respectively.

In (a) of FIG. 16, some pixels have a large luminance value, and some pixels of the modulated image that is observed are saturated. Thus, in the reconstructed image not using saturation constraint, as illustrated in (b) of FIG. 16 and (b) of FIG. 17, the data fidelity term does not correctly function and an artifact like salt and pepper noise is generated. On the other hand, in the reconstructed image using saturation constraint according to the embodiment illustrated in (c) of FIG. 16, such an artifact is not generated.

As described above, the imaging system 10 according to the embodiment captures an image by using the color filter 202, performs a color image generation process by introducing constraint using saturated pixels into the compressed sensing technique, and is thereby able to reduce artifacts and obtain a high-resolution color image.

The imaging system according to the embodiment of the present disclosure is useful to obtain an image in which reduction of resolution and occurrence of artifacts are suppressed, in a color imaging apparatus that obtains three pieces of wavelength information for R, G, and B by using one image sensor.

What is claimed is:

1. An imaging apparatus comprising:
   an image-forming optical system that forms an image by using optical signals;
   an imaging device that includes a plurality of pixels, receives, with the plurality of pixels, the optical signals used to form the image, and converts the optical signals into electric signals; and
   a color filter that is located between the image-forming optical system and the imaging device and has a light transmittance which differs according to positions on the color filter corresponding to the plurality of pixels and according to a plurality of wavelength bands,
   wherein light transmittances at the individual positions on the color filter have a correlation coefficient of less than 1 in each of the plurality of wavelength bands.

2. The imaging apparatus according to claim 1, wherein the plurality of wavelength bands are three wavelength bands.

3. The imaging apparatus according to claim 1, wherein the color filter has a light transmittance which differs according to the positions on the color filter corresponding to the plurality of pixels and according to the plurality of wavelength bands.

4. The imaging apparatus according to claim 1, wherein light transmittances at n positions on the color filter and light transmittances at other n positions on the color filter have no correlation in each of the plurality of wavelength bands.

5. The imaging apparatus according to claim 1, wherein light transmittances at the individual positions on the color filter corresponding to the plurality of pixels are distributed in accordance with uniform random numbers.

6. The imaging apparatus according to claim 1, wherein light transmittances at the individual positions on the color filter corresponding to the plurality of pixels are distributed in accordance with Gaussian random numbers.

7. The imaging apparatus according to claim 1, wherein the color filter includes a spatial light modulator having a light transmittance which differs according to the positions corresponding to the plurality of pixels and according to the plurality of wavelength bands.

8. The imaging apparatus according to claim 1, wherein
   the color filter includes cut-films each corresponding to one of the plurality of wavelength bands, and
   the cut-films each have a thickness which differs according to the positions corresponding to the plurality of pixels.

9. The imaging apparatus according to claim 8, wherein the cut-films each have a light transmittance of 1 in at least one of the plurality of wavelength bands.

10. The imaging apparatus according to claim 1, wherein
    the color filter includes cut-films each corresponding to one of the plurality of wavelength bands, and
    the cut-films each are located only at positions corresponding to some pixels among the plurality of pixels.

11. The imaging apparatus according to claim 1, further comprising:
    a transmission circuit that transmits information representing the light transmittance of the color filter.

12. An imaging system comprising:
    an imaging apparatus; and
    an image generation apparatus,
    wherein the imaging apparatus includes:
    an image-forming optical system that forms an image by using optical signals;
    an imaging device that includes a plurality of pixels, receives, with the plurality of pixels, the optical signals used to form the image, and converts the optical signals into electric signals;

a color filter that is located between the image-forming optical system and the imaging device and has a light transmittance which differs according to positions on the color filter corresponding to the plurality of pixels and according to a plurality of wavelength bands; and a transmission circuit that transmits information representing the light transmittance of the color filter and the electric signals, wherein light transmittances at the individual positions on the color filter have a correlation coefficient of less than 1 in each of the plurality of wavelength bands, and wherein the image generation apparatus includes:
a reception circuit that receives the information representing the light transmittance of the color filter and the electric signals; and
an image generation circuit that generates an image for each of the plurality of wavelength bands by using the information representing the light transmittance and the electric signals.

13. An image generation apparatus used in an imaging system including an imaging apparatus,
the imaging apparatus including
an image-forming optical system that forms an image by using optical signals,
an imaging device that includes a plurality of pixels, receives, with the plurality of pixels, the optical signals used to form the image, and converts the optical signals into electric signals,
a color filter that is located between the image-forming optical system and the imaging device and has a light transmittance which differs according to positions on the color filter corresponding to the plurality of pixels and according to a plurality of wavelength bands, light transmittances at the individual positions on the color filter having a correlation coefficient of less than 1 in each of the plurality of wavelength bands, and
a transmission circuit that transmits information representing the light transmittance of the color filter and the electric signals,
the image generation apparatus comprising:
a reception circuit that receives the information representing the light transmittance of the color filter and the electric signals; and
an image generation circuit that generates an image for each of the plurality of wavelength bands by using the information representing the light transmittance and the electric signals.

14. The image generation apparatus according to claim 13, wherein the image generation circuit generates the image by using the information representing the light transmittance and the electric signals and by using a compressed sensing technique.

15. The image generation apparatus according to claim 14, wherein
y=Ax is satisfied in which y represents a modulated image corresponding to the electric signals, x represents the image for each of the plurality of wavelength bands, and A represents a sampling matrix obtained in advance, and
the image generation circuit generates, as the image, x that minimizes an evaluation function including
a term including a square sum error $|Ax-y|^2$ of the modulated image y and a reconstructed signal Ax,
a constraint term of pixel values of the image x for calculating a minimum value, and
a total variation term in which a gradient of a luminance component and a gradient of a chrominance component of the image are separated.

16. The image generation apparatus according to claim 13, wherein the image generation circuit changes a process if a modulated image corresponding to the electric signals is saturated.

17. The image generation apparatus according to claim 16, wherein
the image generation circuit generates an image x that minimizes an evaluation function, and
the evaluation function includes a constraint of giving 0 if a value calculated by multiplying the image x by a sampling matrix exceeds a saturation value and otherwise giving ∞ in a pixel where the modulated image is saturated.

18. A color filter that filters light in a plurality of wavelength bands, wherein
a combination of light transmittances in the plurality of wavelength bands differs at certain positions at which light in the plurality of wavelength bands is transmitted,
the plurality of wavelength bands include a first wavelength band, a second wavelength band, and a third wavelength band,
at a first position, the color filter has a light transmittance of 98 to 100% in the first wavelength band and has a light transmittance of less than 98% in the second and third wavelength bands,
at a second position different from the first position, the color filter has a light transmittance of 98 to 100% in the second wavelength band and has a light transmittance of less than 98% in the first and third wavelength bands, and
at a third position different from the first and second positions, the color filter has a light transmittance of 98 to 100% in the third wavelength band and has a light transmittance of less than 98% in the first and second wavelength bands.

19. The color filter according to claim 18, wherein, in each of the first, second, and third wavelength bands, light transmittances at the individual positions are distributed in accordance with uniform random numbers or Gaussian random numbers.

20. An imaging apparatus comprising:
a color filter that receives light and outputs resulting light, the color filter including a plurality of cut-films including a first cut-film and a second cut-film; and
an imaging device that includes a plurality of pixels that receive the resulting light and output a plurality of electric signals, the plurality of pixels and the plurality of cut-films corresponding to each other in a one-to-one relationship,
wherein the first cut-film includes a third cut-film and a fourth cut-film, and the second cut-film includes a fifth cut-film and a sixth cut-film,
wherein a length between the third cut-film and a surface where the color filter receives the light is smaller than a length between the fourth cut-film and the surface,
wherein a length between the fifth cut-film and the surface is either smaller or larger than a length between the sixth cut-film and the surface,
wherein the third cut-film has a light transmittance in a first wavelength that is higher than first light transmittances in wavelengths other than the first wavelength, the fifth cut-film has a light transmittance in the first wavelength that is higher than the first light transmittances, the fourth cut-film has a light transmittance in a second wavelength that is higher than second light transmittances in wavelengths other than the second wavelength, the sixth cut-film has a light transmittance in the second wavelength that is higher than the second light transmittances, and the first wavelength is different from the second wavelength, and wherein a thickness of the third cut-film is different from a thickness of the fifth cut-film, and a thickness of the fourth cut-film is different from a thickness of the sixth cut-film.

\* \* \* \* \*